US009063765B2

(12) United States Patent
Fallows

(10) Patent No.: US 9,063,765 B2
(45) Date of Patent: Jun. 23, 2015

(54) SYSTEM AND METHODS FOR DISTRIBUTED EXECUTION OF COMPUTER EXECUTABLE PROGRAMS UTILIZING ASYMMETRIC TRANSLATION

(75) Inventor: John R. Fallows, San Jose, CA (US)

(73) Assignee: Kaazing Corporation, San Jose, CA (US)

( * ) Notice: Subject to any disclaimer, the term of this patent is extended or adjusted under 35 U.S.C. 154(b) by 1052 days.

(21) Appl. No.: 12/429,999

(22) Filed: Apr. 24, 2009

(65) Prior Publication Data

US 2009/0271771 A1    Oct. 29, 2009

Related U.S. Application Data

(60) Provisional application No. 61/125,836, filed on Apr. 28, 2008.

(51) Int. Cl.
*G06F 9/45* (2006.01)
*G06F 9/455* (2006.01)

(52) U.S. Cl.
CPC .............. *G06F 9/45516* (2013.01); *G06F 8/51* (2013.01); *G06F 9/45525* (2013.01)

(58) Field of Classification Search
CPC ........ G06F 9/45516; G06F 8/443; G06F 9/45
USPC ......................................... 717/137, 151–161
See application file for complete search history.

(56) References Cited

U.S. PATENT DOCUMENTS

| | | | |
|---|---|---|---|
| 5,551,015 A * | 8/1996 | Goettelmann et al. ........ | 717/137 |
| 5,581,696 A * | 12/1996 | Kolawa et al. ............... | 714/38.1 |
| 6,282,702 B1 * | 8/2001 | Ungar ........................... | 717/148 |
| 6,823,504 B1 | 11/2004 | Sokolov | |
| 6,889,260 B1 | 5/2005 | Hughes | |
| 6,892,200 B2 | 5/2005 | Eich | |
| 6,898,786 B1 | 5/2005 | Sokolov | |
| 7,058,699 B1 | 6/2006 | Chiou et al. | |
| 7,082,455 B2 | 7/2006 | Hu et al. | |
| 2004/0111713 A1 * | 6/2004 | Rioux ........................... | 717/137 |
| 2006/0230070 A1 * | 10/2006 | Colton et al. ............... | 707/104.1 |
| 2006/0282453 A1 * | 12/2006 | Tjong et al. .................. | 707/102 |

OTHER PUBLICATIONS

Miecznikowski & Hendren, Decompiling Java Using Staged Encapsulation, Sable Research Group, School of Computer Science, McGill University, Montreal, Canada (2001).

* cited by examiner

*Primary Examiner* — Wei Zhen
*Assistant Examiner* — Brahim Bourzik
(74) *Attorney, Agent, or Firm* — Van Pelt, Yi & James LLP

(57) ABSTRACT

Dynamic program translation is utilized to convert an executable program in a first language executable representation to a second language executable representation that is either optimal or essentially required for execution within a defined execution environment on a client computer system. A dynamic translator, typically executed on a first computer system, is invoked in response to a request from a second computer system to provide an identified executable program. The dynamic translator performs an execution path analysis and optimized translation from a first representation, such as a Java class file, to generate executable code in the second representation, such as JavaScript. Optimizations include cross-language feature modifications, selective replacement of nominally un-translatable code portions, and insertion of call-back service requests to dynamically emulate services required in the execution of the program.

17 Claims, 6 Drawing Sheets

SYSTEM AND METHODS FOR DISTRIBUTED EXECUTION OF COMPUTER EXECUTABLE PROGRAMS UTILIZING ASYMMETRIC TRANSLATION

This application claims the benefit of U.S. Provisional Application No. 61/125,836, filed Apr. 28, 2008.

BACKGROUND OF THE INVENTION

1. Field of the Invention

This invention is generally related to the cooperative execution of computer programs on distributed computer systems and, in particular, to an asymmetric translation of computer executable programs to enable computer programs to be efficiently executed on alternative platforms and in alternative execution environments.

2. Description of the Related Art

The proliferation of distributed computing platforms of varying nature and capability is creating a problem for computer system and software manufacturers. Practicalities increasingly require manufacturers to quickly, if not immediately, provide and maintain cross-platform software system execution compatibility. These software systems are often complex and typically involve distributed components executed on multiple computer platforms. Compatibility is naturally required for major existing computing platforms as well as significant new platforms.

Earlier in the history of distributed computing systems, the local execution environments provided by servers and client computer platforms were sufficiently definite, if only through a constraint policy of homogenous configuration, to ensure that these software-based systems could be reliably executed. Now, wide-area data communications are increasingly available, coupled with an expectation of use, and demand for flexibility, both personal and by businesses, in computing platform choice, particularly of client platforms. Configuration presumptions and policies are no longer sufficient.

A related problem arises whenever there are significant changes, including obsolescence, of a previously supported computer platform. Where the local executing environment is significantly modified, involved changes are often required to preserve or restore cross-platform compatibility. For obsolescence, the software system must be ported to a new computer platform. Both require the investment of significant resources. A functional, business, or other requirement to adapt the software system to any new local executing environment will also require the same resource investment.

In order to reduce the resource investment to achieve cross-platform compatibility, many complex software systems have been developed utilizing the Java™ platform and programming language (www.java.com; Sun Microsystems, Inc., Santa Clara, Calif.). In a classic programming environment, source code is compiled target specific to a particular operating system and corresponding executable format. Although language standardization and cross-compilers significantly aid in producing cross platform compatible executables, as a practical matter, significant distinctions remain and full compatibility is often difficult to obtain and, further, to maintain over the life of a software system.

A key benefit of Java is an additional layer of platform independence is provided through use of a Java Virtual Machine (JVM). The Java language compiler compiles Java source code (signified with a .java file extension) to an intermediate binary representation known as Java bytecode (signified with a class file extension). The Java bytecode is then functionally interpreted by a platform specific JVM. That is, the bytecode is interpreted against a fixed virtual machine model through the execution of the JVM by the host platform. In modern JVM implementations, bytecode may be further compiled, in part, and executed as target specific platform binary code. As a result, bytecode is often conventionally described simply as being executed. By isolating target platform specifics within the JVM, platform independent Java source code can be developed and maintained with lowered resource costs.

In order to more efficiently leverage the JVM, a Java Run-Time Environment (JRE) is supplied as a library adjunct to the JVM. For user programs written in Java for execution by the JVM, the JRE provides a standardized set of application programming interfaces (APIs), defined as methods within classes grouped in packages, to provide standard services, such as filesystem, graphics, and network access support. While the JRE APIs are target independent, the implementation of the JRE libraries includes both cross-platform and platform-specific bytecode as appropriate to access and utilize the functionality of the underlying operating system environment, or that of other programs and libraries that exist in the local execution environment. Use of platform-specific bytecode within the JRE is entirely transparent to Java programs.

The platform-specific JREs have been developed by Sun and others for a wide variety of target platforms including those that deployed as server and client tiers in the implementation of distributed computer systems. In a server execution environment, the Java programs are typically used to implement business logic, access database storage, and interact with other programs, services, and systems, both local and remote relative to the server tier. Conventionally, these Java programs may be collectively referred to as "web applications," where communications are routed over a network, including the Internet or an intranet, utilizing the Java networking APIs, where the targeted client application is a Web browser, or where the communications protocol is a HTML-based or similar markup language.

In a client execution environment, Java programs conventionally run either in a JVM executed directly by the client computer platform or in a JVM plugin embedded in a Web browser. Where directly executed by the client computer system, the JRE and JVM have essentially direct access to the operating system and other programs and services available in the local execution environment. Where executed under a JVM plugin, such access is constrained by the security model of the Web browser and, from a performance perspective, further limited by the browser plugin architecture. Although the JVM and modern Web browsers are substantially optimized, the routing of communications through the Web browser, check constraints on the operating behavior of the Java program, as well as the requirement for co-execution of both the Java program, JVM, and Web browser introduces certain performance penalties. Conventionally, the JVM plugin is considered a heavy-weight plugin, requiring substantial persistent storage space and substantial active memory and processor resources for execution even for small Java programs. In view of these drawbacks to browser-based execution of Java programs, a Java Web-Start package was developed by Sun. This package enables initial provisioning of a Java program through a Web-browser connection, but otherwise permits execution of the client application in a JVM directly hosted on the client platform.

Given the benefits of Java-based server and client programs, industry and popular adoption of Java has been substantial to date and is likely to continue for a substantial period of time. Unfortunately, many newer client computer platforms either do not possess sufficient resources to support execution of a complete JRE/JVM package or otherwise prefer to support other client-oriented technologies including other, relatively light-weight plugins to provide services and functions that could otherwise be implemented through a Java program. Even where sufficient resources are present, there is always a distinct, though generalized desire for improved program execution performance on all platforms.

Consequently, a distinct need exists for system architecture oriented improvements capable of improved support for cross-platform program execution and, in particular, improvements in the ability to efficiently execute Java programs in multiple distinct local execution environments including those without JVM support.

SUMMARY OF THE INVENTION

Thus, a general purpose of the present invention is to provide an efficient system and methods for performing translation of computer executable programs to enable such computer programs to be executed efficiently on alternative platforms and in alternative execution environments.

This is achieved in the present invention by providing dynamic program translation to convert an executable program in a first language executable representation to a second language executable representation that is either optimal or essentially required for execution within a defined execution environment on a client computer system. A dynamic translator, typically executed on a first computer system, is invoked in response to a request from a second computer system to provide an identified executable program. The dynamic translator performs an execution path analysis and optimized translation from a first representation, such as a Java class file, to generate executable code in the second representation, such as JavaScript. Optimizations include cross-language feature modifications, selective replacement of nominally un-translatable code portions, and insertion of call-back service requests to dynamically emulate services required in the execution of the program.

An advantage of the present invention is that the selection and use of dynamic translation allows conversion of an existing executable program to a language executable representation that is optimal for an execution within the available local execution environment of a target computer system. The target representation can be chosen to achieve direct, native execution by the target computer system or execution in conjunction with only a light-weight run-time library or plugin. Use of the present invention allows an existing executable to run in an environment that either does not support the executable representation or is sub-optimal due to the requirement of co-execution with a heavy-weight run-time library or plugin.

Another advantage of the present invention is that the dynamic translation includes optimizations that efficiently account for differences between the source and target language representations. Differences in threading, API utilization, object orientation, and other language services are analyzed and converted. Exceptional services, including remote method invocation and reflection, are resolved at run-time and emulated to preserve the functional operation of the executable program.

A further advantage of the present invention is that the translation operation is asymmetric in that it preferably operates from a source language binary representation to produce a target language source code representation. Initial translation analysis proceeds directly from the typically binary source language executable representation with the analysis and code generation producing a translated language executable representation in a source code form. This target language source code form can be directly executed, utilizing an interpreter, or further subjected to static and dynamic compilation to realize a target language binary executable. Consequently, access to the original program source code is not required by virtue of the present invention.

Still another advantage of the present invention is that, through dynamic translation, the source language executable representation can be translated as needed to execute within the local execution environment of a requesting client computer system. By on-demand translation of Java bytecode to a functionally equivalent JavaScript code form, the executable program can be dynamically adapted for native execution within a conventional Web browser. Issues regarding the presence and version of a JVM are thus avoided. Even where a JVM is available, dynamic translation to JavaScript will avoid any performance penalty associated with utilizing the JVM. Translation to Adobe Flash's ActionScript, Microsoft's XAML, or another language representation for execution in conjunction with a light-weight library or plugin may also be preferred to execution within a JVM.

Yet another advantage of the present invention is that distributed application architectures can be leveraged to ensure a complete functional translation of a source language executable representation to a target representation. The functions provided through source language standard APIs can be satisfied by any combination of direct translation to target language standard APIs, indirect translation through incorporation of target language library implementations, and functional translation through incorporation of run-time call-back operations to a network available service or server capable of either implementing or emulating a required function.

DETAILED DESCRIPTION OF THE INVENTION

Figure 1:
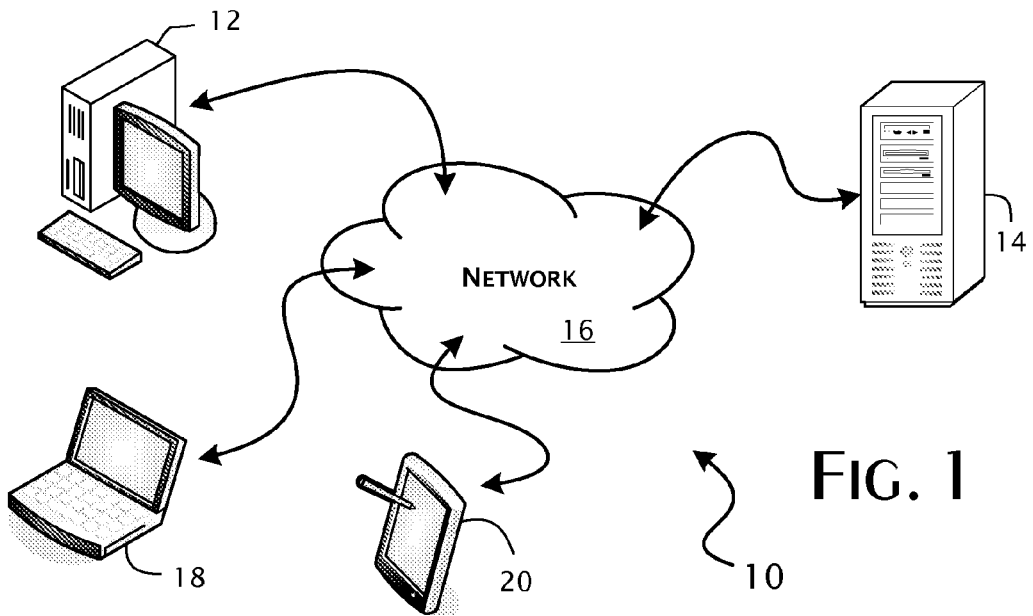
FIG. 1 is a system network architecture illustrating a preferred operating environment for a preferred embodiment of the present invention.

The present invention provides an efficient system and methods for performing translation of computer executable programs to enable such computer programs to be executed efficiently on alternative platforms and in alternative execution environments. While the present invention will be described in the following detailed description with respect to the translation of Java bytecode to JavaScript, standardized as ECMAScript, consistent with the preferred embodiment, the present invention is applicable to translations to and from other language representations. Also, for purposes of convenience, like reference numerals will be used to designate like parts depicted in one or more of the figures.

Referring to FIG. 1, the present invention is generally applicable to distributed computing environments 10. Typically, a client computer 12 executes a computer program within a local execution environment supported by the platform and generally defined by the combination of host processor, memory, peripherals, operating system and additional programs. Locally executed programs will access a typically remote server computer system 14 through a communications network 16, in order to obtain data directly, produced through the execution of a server local service, or from another client or server accessed through the server 14.

In the implementation of conventional client-server distributed computer applications, a client application will access a server application to store and retrieve data and to request performance of server specific services. In common implementation the client application is a Java program that is retrieved from persistent storage local to the client 12 and executed within the client local execution environment of the client 12. Typically, the server application is implemented through execution of a combination of general and application specific programs, often including Java program components.

In order to execute a Java-based client application, client local copies of the JVM and JRE are required. A significant difficulty arises where the client platform does not support a fully featured local execution environment. Limited execution environments are often encountered in netbooks 18, including other small-form factor notebook computers, and mobile computing devices 20, including mobile phones, slate, tablet, and thin-client computers. For these devices, a JVM and JRE may not be provided or, if available, are restricted in capability or by host processing performance limitations. As a result, the execution of a Java client application is either not possible or too highly constrained to be practical.

Figure 2:
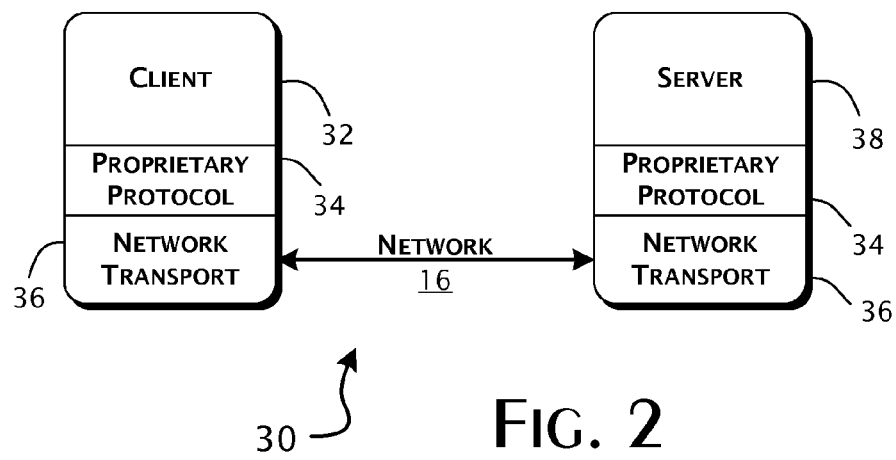
FIG. 2 is a software block diagram showing a typical distributed application architecture to which the present invention is applicable.

Due to the significant benefits of the cross-platform capabilities of the Java language, many Java-based client-server applications have been developed and remain actively deployed. As generally shown in FIG. 2, the client application in a client-server application 30 typically includes a client program 32, a custom Java library 34, such as a proprietary protocol layer, and a network layer 36, typically implemented through a combination of the JRE, JVM, operating system and client platform. The server application similarly includes a server program 38. Where the Java library 34 is applicable to the server program 38, as is in the case where the Java library 34 implements a proprietary communications protocol, the server program 38 will often include a Java component that communicates with the client application through the server-side library and network layers 34, 36.

In accordance with the present invention, the Java client program 32, client-side Java library 34 and the JRE library portion of the network layer 36, are translated into JavaScript so as to be directly executable within a conventional Web-browser application provided and supported by the client platform 12, 18, 20. Given that conventional Web-browsers internally include a JavaScript interpreter, the execution of JavaScript is considered native. Other interpreters, such as for ActionScript, can be incorporated into conventional Web-browser applications through the inclusion of light-weight plugins. For purposes of the present invention, the execution of ActionScript and similar languages by a conventional Web-browser application is considered native. Like support for the JVM, however, different client platforms 12, 18, 20 may not support any or all of the plugin-based languages, any one of which might in different circumstances be more desired than another for the implementation a particular client program 32 or client library 34. Consequently, the present invention can, in alternate embodiments, dynamically identify and provide for the translation of the Java client application into the best client-supported natively executable language. The resolution of best may be determined from configuration options specified either on the client or server platforms 12, 14 or inferred by analysis of the available native client languages and the requirements of the Java client application.

Figure 3:
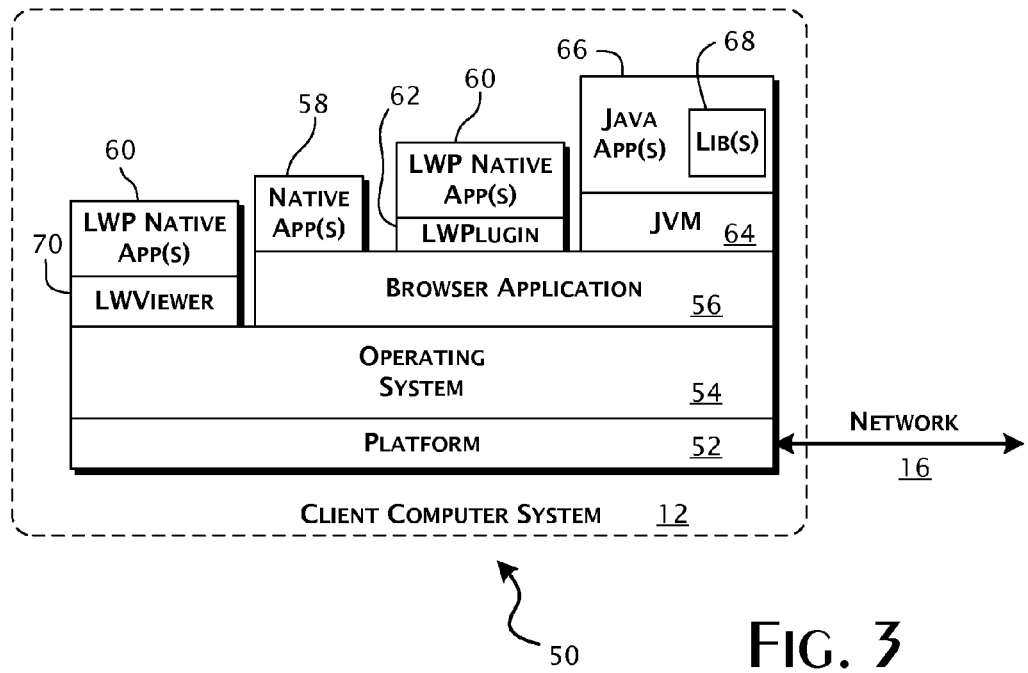
FIG. 3 is block diagram detailing the structure of a client computer system as implemented in accordance with a preferred embodiment of the present invention.

The functional layered structure 50 of a client computer system 12 as used in a preferred embodiment of the present invention is generally illustrated in FIG. 3. A conventional hardware platform 52 provides for connection to a network 16 through the execution of an operating system 54 that, in together, defines a local executing environment for application programs. In a preferred embodiment of the present invention a conventional Web browser application 56 is executed within the local executing environment. Also conventionally, the Web browser application 56 can issue a network request to a remote server computer system 14 in response to direct or indirect interaction with an end-user. In a preferred embodiment, the request URI (Uniform Resource Identifier) encodes the address of the target server computer system 14 network address, a resource identifier, and, optionally, a coded identifier descriptive of the local execution environment supported by the client computer system 12. The resource identifier can be a Web-page, Web-Start, or other application-specific identifier of an application requested for execution on the client computer system 12.

An application is returned to the client computer system 12 in response to the network request. Where a coded identifier is not provided to the server computer system 14, the server will return a specific language implementation of the application based on a default choice that may be further dependent on the client address identifier embedded in the URI request. Preferably, the retrieved application is a native application 58 directly executable within the context of the Web-browser application 56. In typical use, the native application 56 will be implemented as a JavaScript program that can be directly executed by a JavaScript interpreter embedded in the Web-browser 56. The native application 56 may be also implemented using a combination of programming languages, including HTML (HyperText Markup Language), DHTML (Dynamic HTML) and other likely script-based languages that may be executed by a Web-browser 56 embedded engine.

For purposes of the present invention, native applications 56 include light-weight plugin applications 60 that can be executed by an embedded engine provided typically as a conventional plugin 62 to the Web-browser application 56. Light-weight plugins 62 are distinguished as much quicker to load and initialize in response to a native application execution request, require significantly fewer computing resources, and provide a relatively more focused, and restricted, set of program library functions. The plugin-wrapped combination of a JVM and JRE 64 is effectively the categorical definition of a heavy-weight plugin. Categorical light-weight plugins include the Flash plugin (Adobe, Inc.), the Curl plugin (Curl Corporation), and the Silverlight plugin (supports only a limited subset of the .NET Framework; Microsoft Corporation).

The present invention also enables execution of native applications 58, 60 in other applications hosted by the operating system 54. Light-weight viewers 70, also frequently referred to as players, execute as local applications and include embedded engines that permit functionally equivalent or similar execution of native applications 60. The Adobe Flash Player, for example, includes an ActionScript interpreter allowing direct, browser-less execution of ActionScript-based native applications 60. Other stand-alone engines, typically embedding interpreters script-based languages, are also available.

Figure 4:
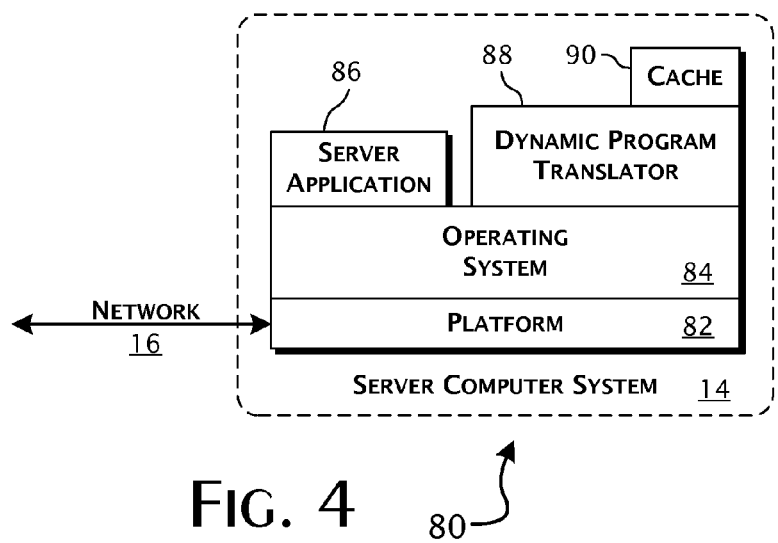
FIG. 4 is block diagram detailing the structure of a server computer system as implemented in accordance with a preferred embodiment of the present invention.

The functional layered structure 80 of a server computer system 14, as used in a preferred embodiment of the present invention, is generally illustrated in FIG. 4. The hardware platform 82 provides access to the network 16 through execution of an operating system 84. A server application 86 is executed within the local execution environment provided by the platform and operating system 82, 84. A dynamic program translator 88 is also executed within the server-local execution environment. Preferably, the server application 86 implements a conventional Web application server, including a Web application container that provides a secure runtime environment for web components. In the preferred implementation of the present invention, the dynamic program translator 88 is implemented as Java program components executed in a defined context of the Web application container. The dynamic program translator 88 preferably includes a memory-based cache 90 for storing analysis and translation products produced in the translation of requested Java client programs and Java client program components.

Figure 5:
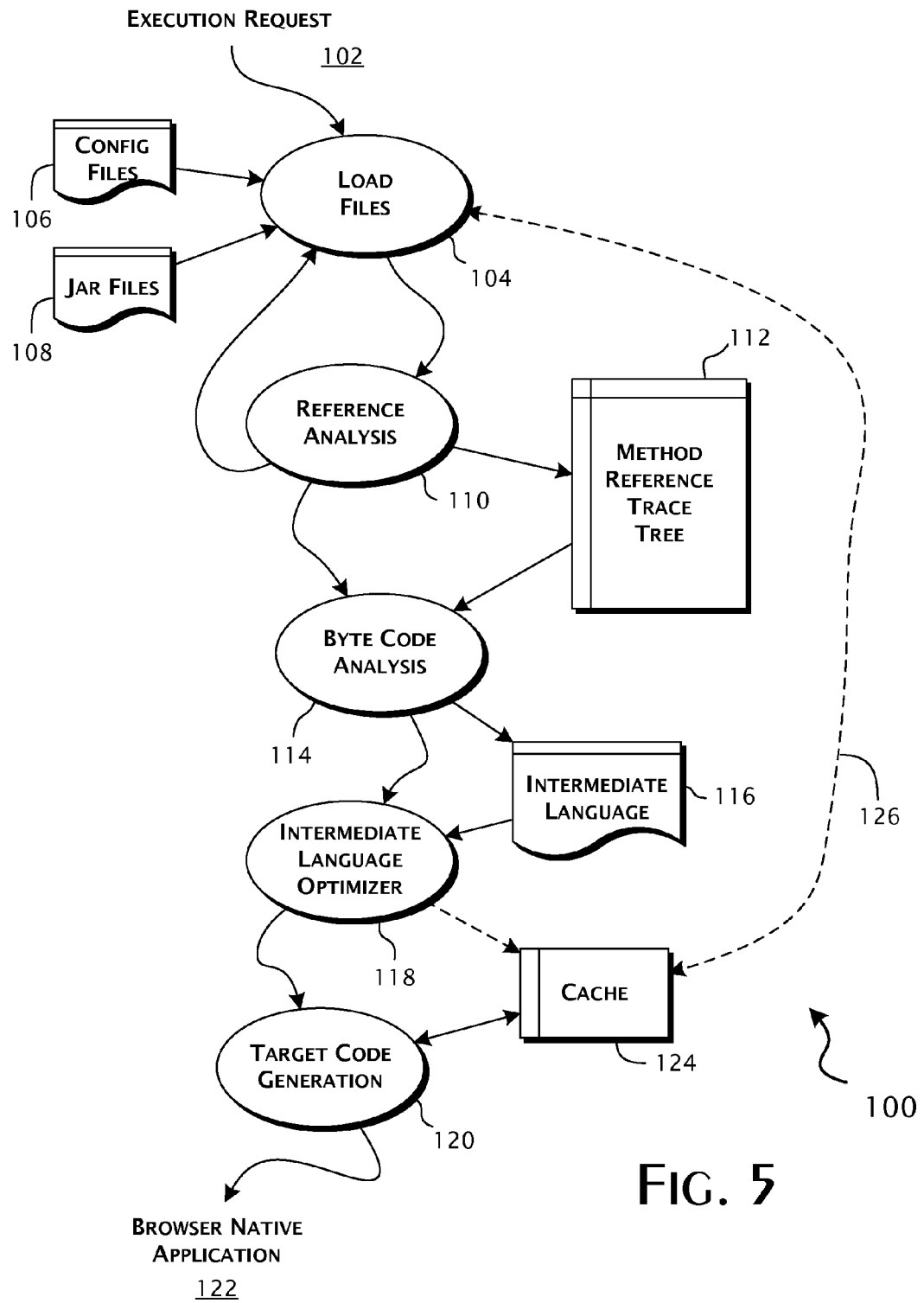
FIG. 5 provides an overview control flow diagram describing a preferred process of performing base code analysis and target code generation in a preferred embodiment of the present invention.

A preferred process 100 of translating a Java client program into a target client program, such as a Web-browser native application, is shown in FIG. 5. In response to a received client application execution request, the request is evaluated and the files of a corresponding Java client program are loaded 104. In evaluating the request, the capabilities of the client computer system 16 may be considered to determine the preferred translation target language. Where information about the client local execution environment is actively provided with the request 102 or as may be determined from local configuration files 106, a translation target language is chosen dependent on the ability maximize performance and functional implementation of the Java client program as translated and executed within the client local execution environment. For example, where translation to JavaScript is possible and may require relatively fewer computing resources, translation to ActionScript, necessitating additional overhead use of the Flash plugin, may be desired as providing a better end-user experience. Availability of the Flash plugin on the client is then determinative of the choice of translation target language.

The Java client program will be typically loaded as a set of one or more of Jar (Java Archive; equivalently denominated War, Ear, and others) files 108. The client program main entry point is identified from the configuration files 106 and a method reference analysis 110 is then performed. In the preferred embodiment of the present invention, a modified JVM is employed to evaluate the bytecode within the class files that make up the client program. This modified JVM, or VM, is instrumented to enable detailed tracing of program execution flow, including method calls and field accesses. Preferably, the client program is not executed by the VM. Rather, the active execution path through the client program is traced by sequential bytecode examination coupled with recognizing bytecode instructions that could alter the program flow path. Reachable paths are followed as valid active execution flow paths. As a result, the modified VM performs a functional reverse engineering of the Java bytecode that, in turn, supports generation of a representation of the programming constructs contained in the client program. Jars and packages, containing class files, are loaded on demand whenever a method within a contained class file is referenced as part of the active control flow path. As the client program is traced, functional descriptions of the method calls and field accesses are collected in a tree data structure 112. As traced, the active control flow paths can and typically will traverse portions of the JRE/JVM, in the particular case of Java client programs, and other third-party libraries with the result that portions of these libraries will be translated as necessary to produce a functionally corresponding client target language program.

The active control flow path bytecode is then subjected to an iterative, multi-pass analysis 114 to discover and consolidate significant programming constructs and field use. This analysis 114 implements and builds on techniques described in "Decompiling Java Using Staged Encapsulation," by Miecznikowski & Hendren, published by the Sable Research Group. For purposes of the present invention, the VM collects references to all methods and fields touched during flow path tracing for use as potential translation candidates. For clarity of discussion, the following description will refer only to method translation here, with the understanding that the same process is applied to field references.

Working from the collected information contained in the tree data structure 112, the bytecode analysis 114 proceeds from the main class entry point to parse and extract the low-level Java assembly language-level instructions. Fundamental method boundaries are detected based on identification of method delimiters observable from the bytecode. Control structure patterns are identified from further analysis of the bytecode within each method considered. This analysis produces encapsulated method control structures and programming statements structurally organized in an intermediate language representation and held in an intermediate language data buffer 116. The intermediate language can be any pseudo-language sufficient for expressing the control flow and program operations of the Java language. In the presently preferred embodiments, the intermediate language representation is essentially JavaScript. As the tree data structure 112 is processed, method references are followed to select corresponding bytecode method blocks for analysis and addition of the corresponding intermediate language methods to the data buffer 116. Method references to bytecode that has already been analyzed and translated to the intermediate language representation are not further followed.

When the tree data structure 112 is exhausted, the intermediate language data buffer 116 will contain a complete, though minimal translated representation of the Java client application. Some methods existing in the Java client program will not be translated because they were not determined reachable by the VM. A reachable method is a method that is present in the nominal active control path flow of the Java client program. These non-reachable methods are not translated at this point and not initially sent to the client computer system 12. Given that Java class files will contain many non-reachable methods for any particular Java program, a significant reduction in initial translated program size, and corresponding network transmission time, is realized through this elimination of non-reachable methods.

On completion of bytecode analysis 114, the intermediate language data buffer 116 contains an in-memory representation of the translated client application. A number of optimizations 118 are then applied principally to improve client program performance and reliability when executed in the client local execution environment. The optimizations preferably include method inlining, dead code elimination, type narrowing, and other modifications to tailor the intermediate language representation specific to the target language representation. These further optimizations include substituting in performance optimized target language method, class and package libraries, adjusting object and structure representations, and abstracting operational details, such as threading and logging. A side benefit of these optimizations is a further reduction in the size of the translated program.

Program code in the target language representation is then generated 120 and, combined with any required supporting resources, such as images, external JavaScript libraries, and style sheets, is served 122 to the requesting client computer system 12. The target code generation may produce code in a single language or in a combination of languages. In the preferred embodiments of the present invention, any discrete components of a composite Java client program may be translated to respective target language representations, resulting in the translation of a Java client program into a combination of, for example, JavaScript and ActionScript.

In a preferred embodiment of the present invention, translated target language methods are progressively added to a cache 124. In the process of loading class files and analyzing method references 104, 110, the cache 124 is checked 126 for existence of a current translated instance of the method being analyzed. If the method exists, then further analysis 110 is skipped and a copy of the method will be retrieved from the cache 124 during target code generation 120. In an alternate embodiment of the present invention, optimization related information can be stored and retrieved from the cache 124 in correspondence with translated methods for use in subsequent optimization 118 operations.

Figure 6:
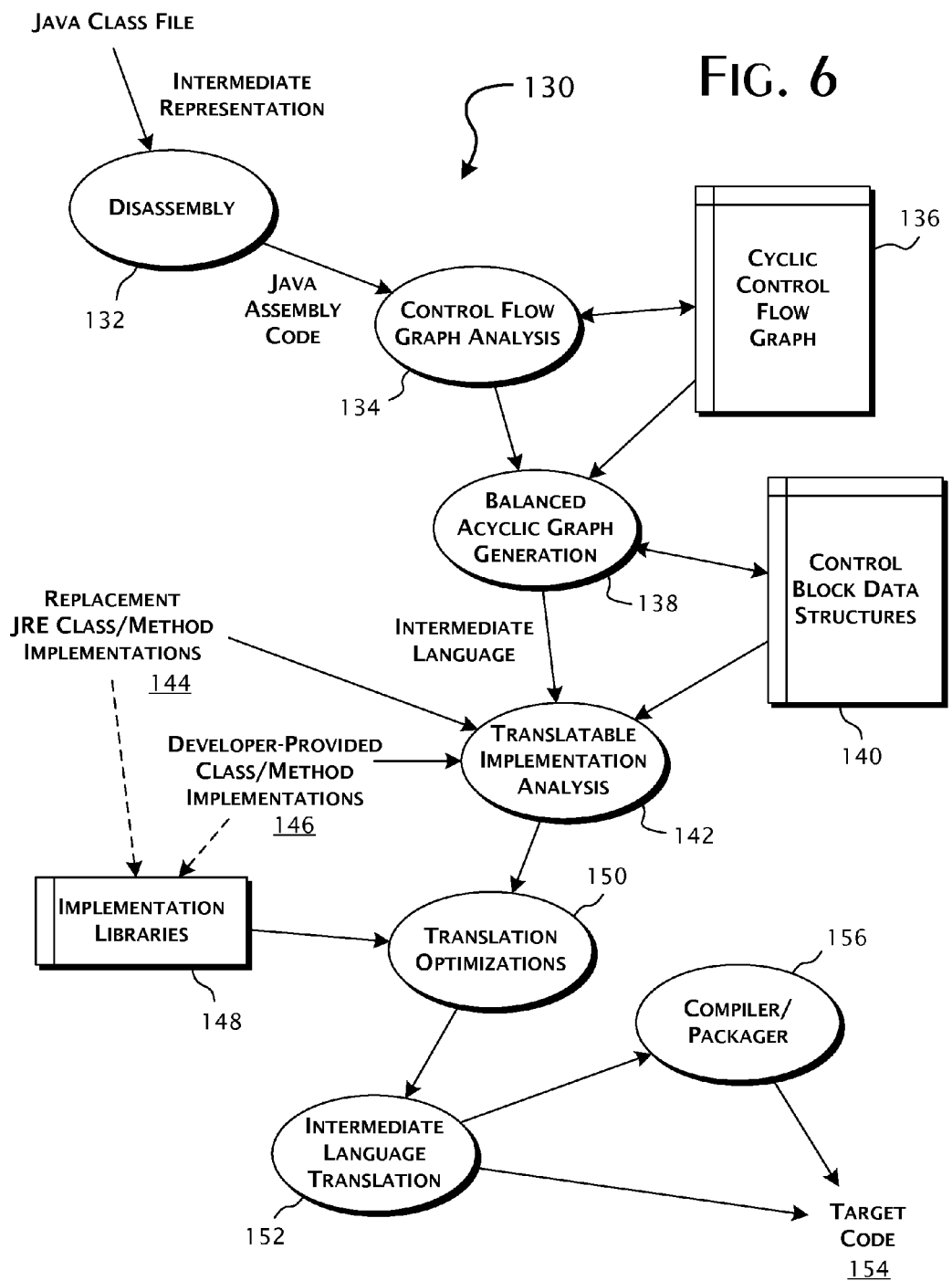
FIG. 6 provides a detailed control flow diagram describing a preferred process of performing base code analysis and target code generation in a preferred embodiment of the present invention.

The preferred Java client program translation process 130 is further detailed in FIG. 6. Given a class file containing a method determined to be in the control path flow of the Java client program, and therefore requiring translation, the class file is initially disassembled or otherwise converted to an assembly or similar language level representation 132. The ASM tool, available from asm.ow2.org, is preferred. Access to the original Java client program source code and, alternately, full decompilation to Java source code, is not required and not preferred. Class file bytecode is the preferred input. Compile-time optimizations and bytecode obfuscation techniques, typically intended to prevent meaningful decompilation, have no negative impact on the operation of the present invention. Thus, the present invention avoids the complexities of full client program source code reconstruction and source-to-source code conversion problems through asymmetric translation of the original client program to an independent client target language program, specifically including JVM executable bytecode to executable JavaScript.

Once the method is disassembled, a control flow analysis 134 is performed to identify the control flow patterns present in the method. These patterns represent control flow jumps, conditionals and repetitions that functionally delimit groups or blocks of program statements. Other control flow patterns are also identified, including try/catch and synchronized blocks, variable types, switch, break and continue statements. A directed, cyclic control flow graph is created and saved preferably to a memory buffer 136.

A second stage of analysis 138 is then performed to reduce the directed, cyclic control flow graph into a balanced, acyclic graph. The directed cycles of the control flow blocks, are analyzed, reduced, and restructured to produce nested encapsulation structures that contain statement representations of the control flow patterns and corresponding block contained program statements. In performing this analysis step, assembly language level program statements are replaced with equivalent intermediate language statements. Variable and member names of the generated intermediate language are created using a sequential naming system, subject to re-allocation on exit from the declaring scope. The resulting nested encapsulation structures are preferably stored in a control block memory buffer 140 as a balanced tree graph, where each block has a single parent and potentially contains many child blocks.

A third stage implementation analysis 142 is then performed against the target language translation of the intermediate language program as captured in the balanced tree graph 140. The intermediate language program is evaluated in combination with configuration information, preferably read from the configuration files 106, to determine a set of statement and structural transformations that can be applied to the intermediate language program. In general, these transformations work to alter the intermediate language program into more appropriate form for serving as a basis for target language implementation. For example, the configuration information preferably includes identifications of replacement JRE 144 and developer-provided 146 target language implementation routines 148 that can be incorporated, typically by reference, into the target language translation. The implementation analysis 142 also considers objects and other program data structures, threading, logging, and other procedural operations, run-time dependent control flow operations, and remote service request operations, for preferred or required alteration in conjunction with target language generation.

Once the transformations are identified, the translation optimizations are applied 150 prior to or in conjunction with the final translation 152 of the intermediate language representation of the client program to the target language representation. In the preferred embodiments of the present invention, target language client program code 154 is produced and made available for serving to a client computer system 12. In an alternate embodiment of the present invention, the target language client program code 154 can be compiled or packaged 156 prior to serving to a client computer system 12. This alternative is desired where client embedded interpreters allow or prefer an intermediate representation of the target language. Depending on the particular target language, the intermediate representation may be achieved through whitespace elimination, consolidation of program statements using aggregate or shortcut formulations, encoding or compression, and compilation.

Figure 7:
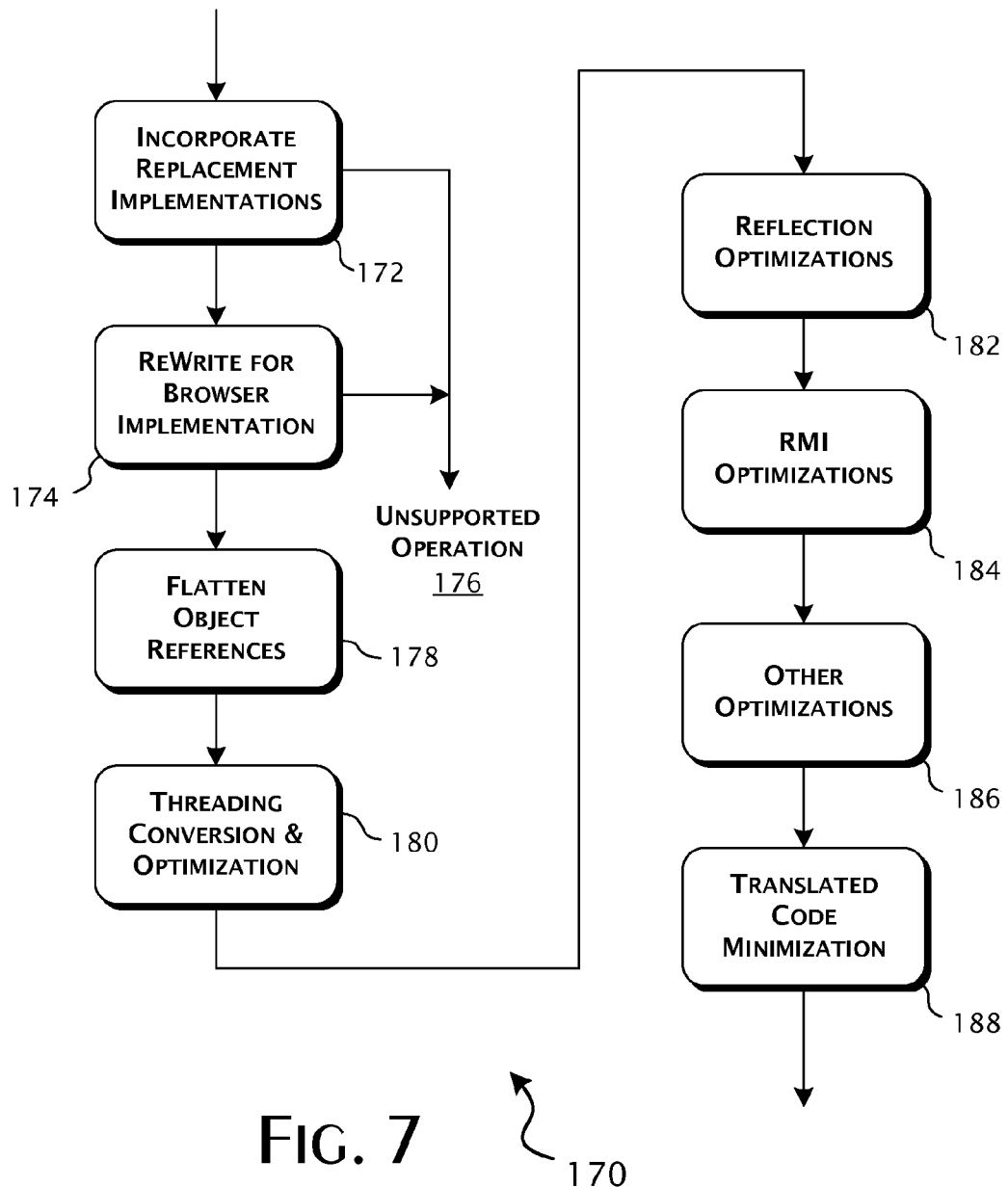
FIG. 7 provides a detailed flow diagram illustrating a preferred process of intermediate language translation and optimization in the production of target code in accordance with a preferred embodiment of the present invention.

A preferred process 170 of applying translation optimizations is shown in FIG. 7. The particular order of the process steps is not believed significant, excepted where noted. In the preferred embodiment, the initial translation optimizations concern the selective incorporation 172 of replacement implementations of methods, classes, and packages. In some cases, a replacement implementation is required in order to produce a functionally equivalent client program. In other cases, a replacement implementation may be desired to provide an alternate implementation that cannot or is not easily derived from unaltered translation or directly for performance reasons. An example of a required replacement implementation occurs for Java client programs that, directly or indirectly, call native or JNI (Java Native Interface) methods. A native method typically encapsulates a call to a natively compiled system library embedded in with the JRE. Native methods are marked in the bytecode so that, on execution, the JVM is directed to reference the native library for execution of the native method requested function.

Figure 8:
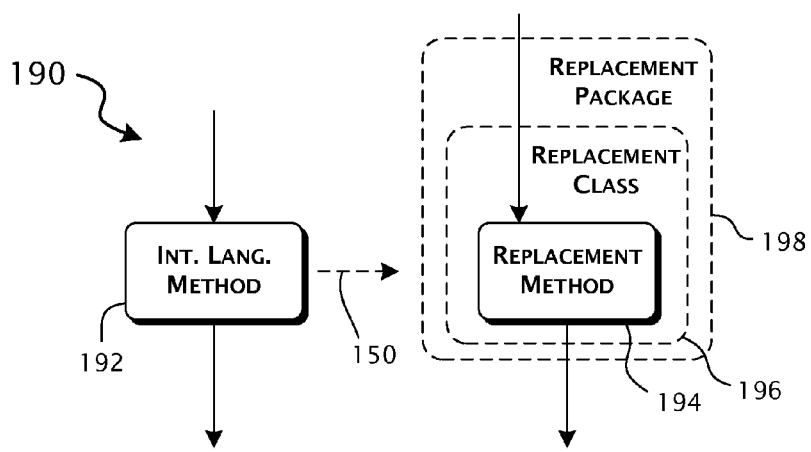
FIG. 8 is a flow diagram illustrating the process of providing a replacement implementation in conjunction with the performance of translation optimization and client target language code generation as implemented in a preferred embodiment of the present invention.

As generally shown in FIG. 8, a preferred process 190 of integrating a replacement implementation is performed by redirecting method references. Where a reference to an intermediate language method 192 is to be replaced, a previously identified method 194 containing a replacement implementation is selected from the implementation library 148. The replacement may be an individual method 194, or a method present in the translated equivalent of a class 196 or package 198. Redirection of the method reference is preferably achieved by altering the namespace, class name, or method name in the intermediate language listing so as to refer to the replacement implementation.

In accordance with the present invention, native methods are preferably not directly translated. In the case of a client native application 58, 60 executed in a browser, often complex and difficult to manage security requirements must be met before a native method call can be permitted. On analysis identification of a native method call, a corresponding target language implementation is selected from the available implementation libraries 148. Preferably, the JRE/JVM implementation list 144 identifies functionally equivalent target language implementations for the most common, if not all, of the JNI methods existing in the JRE/JVM. The developer-provided implementation list 146 identifies implementation for custom JNI methods present in the Java client program. The intermediate language client program will be altered to refer to the identified replacement implementation and the set of referenced replacement implementations will be served to the client computer system 12 as part of the translated client program.

Methods, classes, and packages can also be selectively declared as native in the configuration files 106. While not necessarily JNI methods, the native declaration will cause the implementation analysis 142 to locate and provide for the replacement of these methods, classes, and packages with corresponding replacements preferably provided in the implementation libraries 148. In an alternate embodiment of the present invention, selection of the replacement implementation may be dependent on the client local execution environment, including the specific make and version of the browser application 56, the address of the client computer system 12, any login information provided by an end-user of the client computer system 12, and any applicable information provided by the configuration files 106.

Alternate implementations are desirable in a number of circumstances. JRE API classes and methods may present certain difficulties for translation to a target language. In some instances, the JRE API call may indirectly invoke a JNI call that is itself difficult to emulate in a replacement implementation. In other instances, a full translation of the active control flow path through the JRE, as required by the Java API implementation may be too burdensome. For example, the standard JRE class "java.awt.image.BufferedImage" includes a number of JNI buffer management calls and native code for performance reasons. In these cases, a replacement target language API class implementation provides a pre-optimized, target language appropriate method of emulating the API class function.

In accordance with the present invention, use of replacement implementations, including direct target language equivalent program statements, is almost always desired. The preferred strategy is to switch from translation to emulation by replacement. This has the benefits of increased performance, reduced code size, and reduced server translation time. When the analyzer 142 identifies the potential for replacement implementation, affected portions of the intermediate language is scheduled alteration. Where a replacement target language construct exists, a direct substitution is made. For example, the Java String#length( ) method call has a direct JavaScript equivalent, String#length. The methods of java.io.PrintStream, java.lang.Math, java.lang.Number, java.lang.StringBuffer, java.lang.StringBuilder, java.lang.System, and basic objects java.lang.Boolean, and java.lang.Integer are generally suitable for direct substitution.

Class replacement implementations are preferred over method replacement implementations, and package replacement implementations are preferred over class replacement implementations. For example, while individual Java String method calls may have corresponding JavaScript replacements, use of a replacement implementation for the entire class is preferred for performance reasons. Similarly, the Java Collection package, which resides in the "java.util.*" namespace, is preferably emulated by use of a target language replacement implementation. Preferably, the initial replacement implementation is built by marking all public methods as potential entry points and submitting the package to translation 100. The resulting replacement implementation is then preferably stored with the implementation libraries 148. Optionally, the Collection replacement implementation can be further hand optimized if performance issues arise.

In some cases, a direct mapping does not exist between a standard Java API and an available JavaScript API. This will occur most often due to limitations imposed by the Web-browser context and when there is a mismatch in the Java and JavaScript programming models for the required functionality. In such cases, the intermediate language implementation is rewritten 174 to approximate the required functionality by leveraging sufficiently equivalent services natively provided by the Web-browser application 56. For example, Web-browsers natively limit is the functionality provided by the bulk of the Java networking "java.net.*" classes. Although a Java client program can be granted security access to make or accept network connections on a variety of network ports, the browser imposes strict limitations on the ability of the client program to access a network. To support network connections in a browser, the present invention preferably rewrites the intermediate language program to use a proxy server to implement the originally intended network connection behavior. Similarly, a browser application can support incoming connections by making use of the persistent connection technique known as "Comet" which can be used to allow events sent to the proxy server to be relayed onto the browser application in functional emulation of the native application itself accepting network connections. Other examples of proxy invocation realized through rewriting to leverage Web-browser capability include printing support, image processing, and database access.

An example of a programming model mismatch is the difference in rendering architectures between Java and conventional Web-browsers. The Java JRE/JVM provides finely specified graphics primitives including lines, shading, polygons, and strokes. A web page is historically created and optimized to render high-level document elements, such as blocks and runs of text interspersed with images. In order to emulate the Java graphics API, the intermediate language is preferably rewritten to provide an emulation using specialized tags, such as the <canvas> element, or to use an available light-weight browser plugin that provides graphics drawing support that is a better translation target match.

In all cases where no replacement implementation or rewrite to leverage Web-browser features is available, the translation process 100 will throw an UnsupportedException at translation time 176 and abort the delivery of the application.

In accordance with the present invention, certain programming model mismatches can be corrected through translation optimizations. In particular, differences in the object model used can be removed through optimization. While many target languages support a reasonable analog of the Java object model, JavaScript lacks direct support for object-oriented programming. As a consequence, the intermediate language program is optimized 178 to functionally flatten object references into a procedural calling style conforming to the JavaScript programming model. This is achieved by resolving and relinking all object-oriented lookups and dispatches into procedural equivalents and, further, renaming the called translation units where necessary. Java interface references are maintained, but rather resolved to concrete method references. JavaScript methods will then be generated using a flattened naming style implemented by prepending the fully qualified class name to the name of the method. This prevents naming collisions across methods regardless of the emulated inheritance hierarchy while still maintaining the semantics of the object-oriented model.

Threading is another common programming model mismatch that can be improved through optimization 180. While the JRE has built-in support for running and coordinating multiple threads of execution, the JavaScript language and run-time does not support this functionality. To emulate the Java threading model, the intermediate language program is optimized to executed within a single thread. This optimization is implemented by modifying the intermediate language program to use chained tail recursion to approximate multi-threading. The intermediate language program is modified to pass continuation functions as arguments to methods. The continuation functions are called upon successful completion of the host methods. This allows the methods of the target language program to yield control to the JavaScript runtime, permitting execution of other method operations, while enabling a stateful execution return after yield.

Related to threading, synchronization is another mismatch between the Java and JavaScript programming models. In accordance with the present invention, optimization modification of the intermediate language program can functionally emulate synchronization using continuation functions to continuously reschedule an emulated thread until a monitored data item is available. When an emulated thread exits a synchronized block, the continuation function releases the associated monitor lock held by the emulated thread, thereby allowing another emulated thread, if any, to acquire the lock.

A commonly used Java programming capability not directly supported by JavaScript is referred to as "reflection." Reflection allows Java programs to dynamically load other Java program components by name during run-time execution of the Java program. Consequently, a program component dynamically loaded using reflection can be dependent on the then current execution state of the program. That is, the dependency is not determinable at compile-time. Typically, in the run-time execution of a Java program, execution of a Class.forName( ) method call identifies a class to load to permit continued execution of the program. The name of the class is dynamically constructed.

In the preferred embodiment of the present invention, the presence of a Class.forName( ) method call in the active execution path of the Java client program is determinable. The name of the class to load, however, is not. Therefore, the reflection referenced class is not included in the initial translation of the Java client program. Preferably, as a reflection optimization 182 implemented against the intermediate language program, a replacement implementation is provided to dynamically emulate the execution of the reflection method call. Specifically, on run-time execution of the reflection replacement implementation, the name of the reflection referenced class is determined. A check is then made to determine whether the class has already been translated and the corresponding program component served to the client. If the program component is currently available, it is executed.

If the program component has not been served to the client, the reflection identified class is requested from the server. This network request results in the translation and serving of a corresponding program component. The program component will include translations of methods in the active control flow determined by reference to the reflection identified class. The program component is then integrated into the executing client native application and, as appropriate, executed. In an alternate embodiment of the present invention, configuration information, resident in the configuration files 106 can identify classes that will be required through reflection. These classes can then be included in the generated output even though the classes were otherwise determined non-reachable through static VM analysis.

Optimizations 184 are also applied to support proxied services, such as RMI (Remote Method Invocation), as necessary to support more complex Java client programs, including those utilizing Enterprise JavaBeans, Java Messaging Service, and Java Management Extensions. In the preferred embodiment of the present invention, method calls implementing RMI operations are determinable in the active execution path of the Java client program. The RMI proxy optimization 184 is implemented against the intermediate language program to provide a replacement implementation that requests a server, potentially including server 14, to perform the RMI operation. The parameters of the proxied RMI operation are determinable at run-time by the replacement implementation. The target server to use may be identified at translation-time from the configuration files 106 or determined by the replacement implementation during execution.

Other optimizations 186 preferably include intermediate language program rewriting and inclusion of replacement implementations that may be Web-browser specific and that provide significant alternate implementations potentially depending on the specific client local execution environment provided by a specific client. Given that different Web-browsers may implement even standards defined functions differently, the present invention preferably identifies the requesting Web-browser from the agent identifier provided in conjunction with the initial execution request. Based on the make and version of the Web-browser, different optimization modifications are made in the finally generated target language client program.

More significant alternations can be made where client capabilities are available either statically from the configuration files 106 or as provided as part of the initial client program execution request. Depending on client capabilities, for example whether the Flash plugin is available, different selections may be made in the translation of the client target language program. Where the Java client program has a significant graphics component, generation of ActionScript is typically preferred due to the significant support for drawing primitives analogous to the support provided by the JRE. Where ActionScript execution on the client is not possible, the translation preferably provides for the generation of JavaScript program components that, in combination with HTML <canvas> element support, can implement an emulation the graphic drawing operations of the Java client program.

Non-program code optimizations can also be implemented. In tracing the active control flow path of the Java client program, all actively used resources, such as images and other data files referenced by the Java client, are known during translation. Specifically, user interface components and image elements can request loading of images and other resources at render-time. The reference URIs used to retrieve these resources, typically from the server 14, are determinable during analysis of the active control flow path. In accordance with an alternate embodiment of the present invention, the active set of resources can be packaged and delivered to the client computer system 12 in a performance-optimized manner in conjunction with the serving of the client target language program.

Finally, optimizations 188 to minimize translated code size and improve performance may be implemented against the intermediate language program preferably in conjunction with the generation of the client target language program. These optimizations can include whitespace elimination and, where applicable, merging of program statements, and reduction in variable usage. For JavaScript and similar script language, whitespace is not significant and can be removed without changing the execution behavior of the client target language program. Multiple program statements, typically including those that use temporary local variables to store method references, can be combined. This eliminates generally unnecessary temporary variable usage, also without changing the execution behavior of the client target language program.

Of significance, at least where the client target language is JavaScript, the choice and reuse of variable names has a significant impact on the efficient network transmission of the client target language program to the client computer system 12. Empirically, the choice of variable names, specifically the opportunistic reuse of variable names constrained by scope limitations has been determined to significantly improve network compression rates, resulting in a faster serving of the client target language program to the client computer system 12. It is believed that the frequency and distribution of variable names within typically constructed JavaScript programs is significant in the efficiency of symbol-based compression algorithms. By optimization of the client target language program to opportunistically reuse variable names, a higher symbol hit-rate is achieved, resulting in a higher compression ratio and reduced transmission times.

Figure 9:
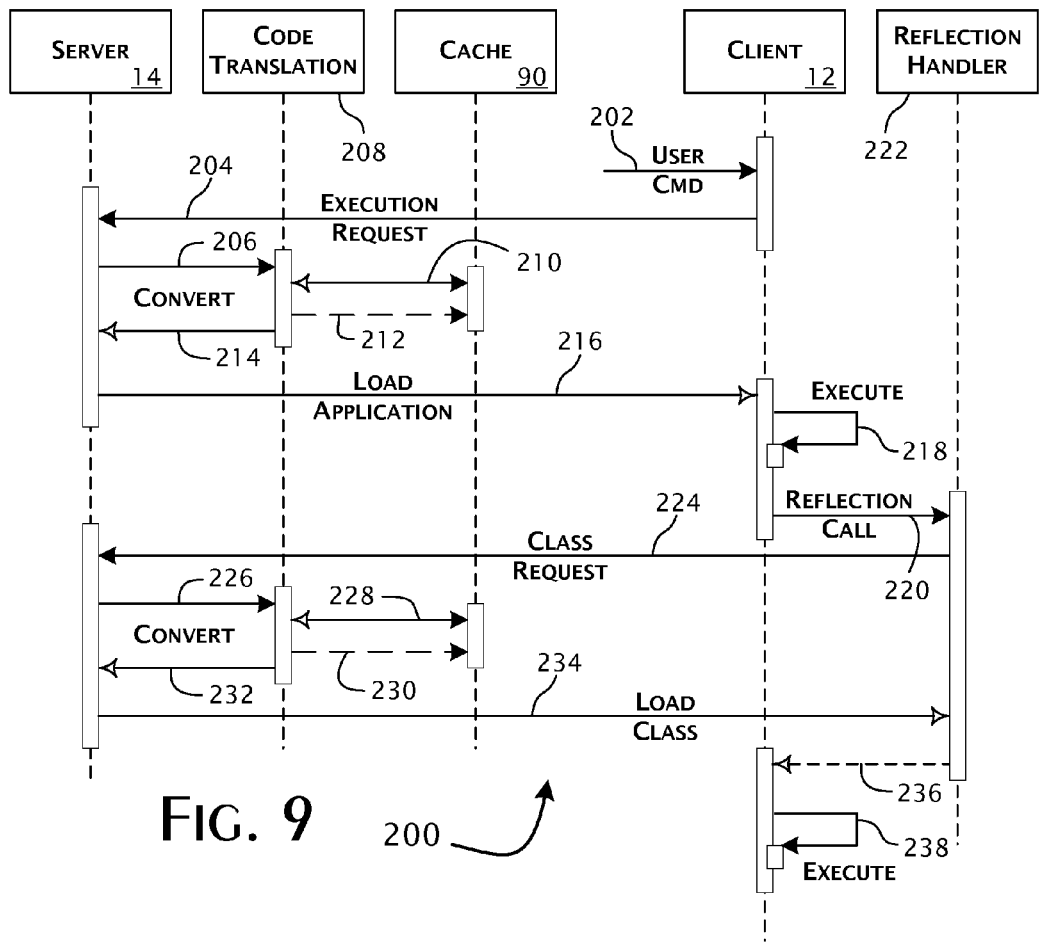
FIG. 9 is a sequence diagram describing the operational control flow in the execution of a distributed application providing support for alternately translated functional operations in accordance with a preferred embodiment of the present invention.

A sequence diagram illustrating a preferred process 200 of dynamic translation and serving of client target language programs, including dynamic reflection resolution, is provided in FIG. 9. In response to a command 202, typically as provided directly or indirectly by an end-user, a client computer system 12 issues an execution request referencing an application selected by the end-user. Although, in an alternate embodiment of the present invention, the client and server computer systems 12, 14 are implemented on the same physical platform, the execution request 204 is transmitted over a communications network 16 between remotely located client and server computer systems 12, 14.

In response to the execution request, the server computer system 14 invokes 206 the dynamic translator 206 implementing the translation process 100 to prepare a Web-browser native client target language program 58, 60. The cache 90 is accessed 210 to determine if any class corresponding portions of the client target language program have been previously translated. Any untranslated portions are identified, translated, and cached 212. Completed preparation of the client target language program is signaled 214 to the server application 86, resulting in the transmission 216 of the client target language program to the client computer system 12.

On receipt of the client target language program, the client computer system loads and begins execution 218 of the application. As shown, a reflection call 220 is encountered in the active execution control path of the client target language program. The reflection replacement implementation, shown as reflection handler 222, provided in the client target language program, is then executed. The reflection call is evaluated and a class request is submitted 224 to the server computer system 14. The server application 86 invokes 226 the dynamic translator 206 implementing the translation process 100, referencing the requested class and corresponding method entry point. The cache 90 is again checked 228 to determine if any of the referenced classes have been previously translated. Untranslated portions are identified, translated, and cached 230. Completed preparation of the client target language program component is signaled 232 to the server application 86, resulting in the transmission 234 of the program component to the client computer system 12. On receipt and loading of the requested program component, the reflection handler 222 completes, and implicitly enables 236 continued execution 238 of the client target language program.

Thus, a system and methods for performing translation of computer executable programs to enable such computer programs to be executed efficiently on alternative platforms and in alternative execution environments has been described. While the present invention has been described particularly with reference to Java and JavaScript as source and target languages, the present invention is equally applicable to other pairings of languages and, further, production of a combination of multiple target languages where a requesting client provides supports. For instance, the served client target language program may include a page with embedded JavaScript, representing the bulk of the client target language program, and also targeted ActionScript for specific presentation elements that are better addressed by Flash. The delivered client target language program may vary across different requesting clients, as well, depending on the client local execution environment capabilities known or communicated to the server.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A system for generating source code, comprising:
a processor configured to:
receive a source binary representation encoded using a first programming language, trace the source binary representation to determine an intermediate representation of the source binary representation,
optimize the intermediate representation, and use the optimized intermediate representation to generate a target source code in at least a second programming language that does not require a virtual machine to execute, wherein the target source code has not been compiled;

wherein optimizing the intermediate representation includes using an intermediate programming language to functionally modify an object-oriented programming model object reference into a procedural programming model version;

and a memory coupled with the processor, wherein the memory is configured to provide the processor with instructions;

wherein functionally modifying the object-oriented programming model object reference includes functionally flatting the object-oriented programming model object reference by resolving and relinking an object-oriented look-up into the procedural programming model version, generating a renamed procedural programming model method by prepending a fully qualified class name to a name of a corresponding oriented programming model method, and modifying the intermediate representation to use a chained tail recursion to approximate a multithreading not directly supported by the second programming language.

2. The system of claim 1, wherein the source binary representation includes a compiled code.

3. The system of claim 1, wherein the source binary representation includes Java bytecode and generating the target source code includes utilizing a Java Run-Time Environment (JRE) replacement.

4. The system of claim 1, wherein the target source code includes JavaScript.

5. The system of claim 1, wherein the target source code includes ActionScript.

6. The system of claim 1, further comprising a communication interface configured to provide the target source code to a client that requested content associated with the source binary representation.

7. The system of claim 1, further comprising a communication interface configured to provide the target source code to a web-browser.

8. The system of claim 1, wherein the processor selects the second programming language in generating the target source code at least in part by analyzing a capability of a client that requested content associated with the source binary representation.

9. The system of claim 1, wherein tracing the source binary representation includes following all valid execution flow paths of the source binary representation.

10. The system of claim 1, wherein tracing the source binary representation includes translating at least a portion of a third-party library referenced by the source binary representation.

11. The system of claim 1, wherein functionally modifying the object-oriented programming model object reference includes emulating a threading synchronization using a continuation function to reschedule an emulated thread.

12. The system of claim 1, wherein optimizing the intermediate representation includes optimizing a variable usage.

13. The system of claim 1, wherein optimizing the intermediate representation includes replacing a portion of the intermediate representation with a corresponding performance optimized version.

14. The system of claim 1, wherein the processor is further configured to compile the target source code.

15. The system of claim 1, wherein optimizing the intermediate representation includes emulating a capability of the first programming language not natively supported by the second programming language.

16. A method for generating source code, comprising:

receiving a source binary representation encoded using a first programming language;

tracing the source binary representation to determine an intermediate representation of the source binary representation;

using a processor to optimize the intermediate representation; and using the optimized intermediate representation to generate a target source code in at least a second programming language that does not require a virtual machine to execute, wherein the target source code has not been compiled;

wherein optimizing the intermediate representation includes using an intermediate programming language to functionally modify an object-oriented programming model object reference into a procedural programming model version;

wherein functionally modifying the object-oriented programming model object reference includes functionally flatting the object-oriented programming model object reference by resolving and relinking an object-oriented look-up into the procedural programming model version, generating a renamed procedural programming model method by prepending a fully qualified class name to a name of a corresponding oriented programming model method, and modifying the intermediate representation to use a chained tail recursion to approximate a multithreading not directly supported by the second programming language.

17. A computer program product for generating source code, the computer program product comprising a non-transitory computer readable storage medium and comprising instruction when executed by the processor, the processor is configured to:

receive a source binary representation encoded using a first programming language;

trace the source binary representation to determine an intermediate representation of the source binary representation;

optimize the intermediate representation; and use the optimized intermediate representation to generate a target source code in at least a second programming language that does not require a virtual machine to execute, wherein the target source code has not been compiled;

wherein optimizing the intermediate representation includes using an intermediate programming language to functionally modify an object-oriented programming model object reference into a procedural programming model version;

wherein functionally modifying the object-oriented programming model object reference includes functionally flatting the object-oriented programming model object reference by resolving and relinking an object-oriented look-up into the procedural programming model version, generating a renamed procedural programming model method by prepending a fully qualified class name to a name of a corresponding oriented programming model method, and modifying the intermediate representation to use a chained tail recursion to approximate a multithreading not directly supported by the second programming language.

* * * * *